Reissued Aug. 26, 1947 Re. 22,909

UNITED STATES PATENT OFFICE 22,909

ANTIOXIDANT

Warren M. Smith, Baton Rouge, La., and Carroll J. Wilson, Norwalk, Conn., assignors to Standard Oil Development Company, a corporation of Delaware No Drawing. Original No. 2,358,833, dated September 26, 1944, Serial No. 411,694, September 20, 1941. Application for reissue December 30, 1944, Serial No. 570,566

4 Claims. (Cl. 252—52)

This invention relates to a novel and efficient antioxidant material adapted for use with various organic materials, particularly petroleum products.

An object of the invention is to provide a composition which, when added to any organic materials normally susceptible to oxidation, such as mineral lubricating oils, gasolines, fatty oils, drying oils, and the like, will inhibit or substantially retard such normal oxidation and deterioration of these materials. In the case of lubricating oils, the incorporation of small proportions of the new antioxidant will substantially retard oxidation and consequent development of corrosive materials in such oils under the severe conditions of service. When added to gasolines, it greatly reduces the formation of gums. Other advantages in the use of the antioxidant material in various organic substances will be evident from the description of the invention which follows.

The novel antioxidant composition of the present invention comprises the aldehydic oxidation product obtained by the mild oxidation of the reaction product of p-cresol and isobutene. The oxidation may be carried out by any suitable process, such as air oxidation or treatment with dichromate or permanganate solutions.

A satisfactory method for the preparation of the reaction product of p-cresol and isobutene consists in reacting these compounds in the presence of sulfuric acid as a catalyst at a temperature of about 70° C. The product has a molecular weight of about 220, a chemical composition corresponding to the empirical formula $C_{15}H_{24}O$, and is, when purified, a white crystalline solid having a melting point of about 69.2° to 69.4° C. This product may be oxidized to form a product having an aldehyde group by reacting the same with a dichromate solution in the presence of sulfuric acid at a temperature of about 70° to about 80° C., and such oxidation product is particularly valuable as an antioxidant in accordance with the present invention, as illustrated in the examples described below.

As previously stated, the new antioxidant may advantageously be used to retard the oxidation of any organic material susceptible to normal deterioration or alteration in the presence of oxygen. It is of particular value in inhibiting the oxidation of mineral lubricating oils under conditions of service in which there are normally formed considerable quantities of oxidation products which are corrosive to metal surfaces. The new antioxidant will greatly retard the formation of such corrosive substances. For this purpose it is generally preferred to add 0.01 to 5%, usually 0.1 to 1.0%, of the material to an oil. The exact amount to be used for optimum results will depend upon several factors, such as the severity of the operating conditions to which the lubricating oil will be exposed and the nature of the mineral oil base stock itself. The additive can be used in distillates and in oils containing residual stocks. The oils may be extracted, filtered, hydrogenated, acid treated or otherwise refined, and of high or low viscosity index, and they may be natural or synthetic oils. The finished lubricating oil compositions may also contain other addition agents such as are found in lubricating compositions, for example, oiliness agents, thickeners, viscosity index improvers, pour depressants, detergents, sludge dispersers, solvents, other antioxidants, dyes, metal pacifiers, etc. The new antioxidant may also be used to advantage in compounded oils and in greases.

The new antioxidant may likewise be employed in gasolines and other motor fuels to decrease the amount of gum formed on standing for long periods. The quantities of antioxidant preferred for this use are in general from 0.001 to about 0.5%.

The antioxidant is of value when added to "white products" obtained from petroleum, such as kerosenes, white oils, and waxes. The amounts to be added are in general of a range similar to that preferred for gasolines.

Many further uses of the new antioxidant material can be mentioned: for example, it may be used in drying oils and in paints and other coating compositions containing such oils to retard skinning; and it may be added to fatty oils of animal or vegetable origin to prevent the development of rancidity; and generally it may be used with any organic materials subject to deterioration by atmospheric oxygen.

A method of preparing the reaction product of p-cresol and isobutene and a method of oxidizing the same to form the desired aldehydic oxidation product of the present invention, as well as an actual oxidation test of materials containing this compound as an ingredient, are described in the examples which follow, which are given by way of illustration only and do not limit the scope of the invention in any way.

EXAMPLE 1

Preparation of a Reaction Product of p-Cresol and Isobutene 324 parts by weight of technical p-cresol and 16 parts by weight of 95.5% to 96% commercial sulfuric acid are agitated at 70° C. in a suitable reaction vessel while isobutene is bubbled through the mixture. After about four hours the reaction is substantially complete, as indicated by the flow of isobutene from the gas exit of the reaction vessel. The reaction mixture is then blown with steam and washed with hot water and then with dilute alkali until neutral. The crude product (89% yield) is an oily material which readily crystallizes when cooled. When the product is recrystallized from hot alcohol, it is obtained in the form of white crystals melting at 69.2° to 69.4° C.

EXAMPLE 2

Oxidation of the Reaction Product of p-Cresol and Isobutene

To a solution of 100 parts by weight of potassium dichromate in 300 parts by weight of water is added 150 parts by weight of 96% sulfuric acid and the mixture heated to a temperature of 70° C. Then there is added slowly, with agitation, 50 parts by weight of the reaction product of p-cresol and isobutene, prepared, for example, by the method described in Example 1. During this addition, which should require about 45 minutes, the temperature may rise to about 80° C., and further temperature rise should be prevented by external cooling means. The reaction product is extracted with aqueous potassium hydroxide and the extract neutralized with hydrochloric acid. The neutralized extract is purified by dissolving in light naphtha and washing with water. The product, recrystallized from alcohol, is a white crystalline powder having a melting point of 185° C.

EXAMPLE 3

Staeger Oxidation Test of Lubricating-Oil Products

The ability of lubricating oils, containing small amounts of the antioxidant of the present invention, to resist deterioration at high temperatures was determined by a test known as the Staeger oxidation test. This test was conducted as follows:

200 cc. of the oil were poured into a glass beaker of 400 cc. capacity. To accelerate aging, a cleaned and polished copper strip 40 x 70 mm. and 1 mm. thick was put into the beaker as a catalyst. The beaker containing the oil and catalyst was placed on a rotating shelf in an oven, the oven temperature being maintained at 110° C. and the shelf rotated at 5 to 6 R. P. M. Purified air was blown through the oven at the rate of 1.5 to 2 cu. ft. per hour. The life of the oil was determined by observing the time required for the oil to show deterioration as evidenced by a neutralization number of 0.2.

An oil having a base consisting of an extracted Mid-Continent oil of 43 seconds Saybolt viscosity at 210° F. and containing 0.1% of the aldehyde of the reaction product of p-cresol and isobutene, as well as a sample of unblended oil base, was tested by the method described above, the results being as shown in Table I.

*Table I*

| Oil | Staeger Life, hrs. |
|---|---|
| Unblended Oil | 85–90 |
| Base oil+0.1% aldehyde of reaction product of p-cresol and isobutene | 575+ |

EXAMPLE 4

Samples of oil blends containing the antioxidant of the present invention, as well as another antioxidant for comparison, were submitted to a bearing corrosion test in which the extent of weight loss in bearings, due to corrosion by the oils, was determined. This test was conducted as follows:

500 cc. of the oil were placed in a glass oxidation tube (13" long and 2⅝" diameter) fitted at the bottom with a ¼" bore air inlet tube perforated to facilitate air distribution. The oxidation tube was then immersed in a heating bath so that the oil temperature was maintained at 325° F. during the test. Two quarter automotive bearings of copper-lead alloy of known weight were attached alternately on opposite sides of a stainless steel rod which was then immersed in the test oil and rotated at 600 R. P. M., thus providing sufficient agitation of the sample during the test. Air was then blown through the oil at the rate of 2 cu. ft. per hour for four hours, after which fresh quarter bearings were supplied to conduct the test for another four hours. After the bearings were removed and washed with naphtha, they were weighed to determine the amount of bearing weight lost by corrosion.

Samples of a refined lubricating oil of S. A. E. 20 grade containing, respectively, 0.25% of aldehyde of the reaction product of p-cresol and isobutene and 0.25% of di (tertiary amyl phenol) sulfide, which has been in commercial use in motor oils for some time as a corrosion inhibitor, as well as a sample of the unblended oil base, were tested in the manner described above. The results are shown in Table II, cumulative bearing weight losses being given, that is, the total weight lost by all four quarter bearings during the eight hours.

*Table II*

| Oil | Cumulative Bearing Weight Loss in 8 Hrs., mg. |
|---|---|
| Unblended Oil | 147 |
| Oil base+0.25% aldehyde of reaction product of p-cresol and isobutene | 23 |
| Oil base+0.25% di (tert.-amyl phenol) sulfide | 44 |

It is readily seen that the aldehyde is a very effective inhibitor of bearing corrosion, allowing only half as much weight loss as a commercially available additive generally rated as a very good corrosion preventive.

EXAMPLE 5

Gasoline Gum Stability Tests

Samples of unblended high olefinic polymer gasoline and of the same containing the aldehyde of the reaction product of p-cresol and isobutene in a concentration of one pound of aldehyde per 1000 gallons of gasoline were tested for gum stability by the standard procedure known as the A. S. T. M. Standard Test D 525–39T (Committee D–2). The results of these tests are shown in Table III.

*Table III*

| Sample | Breakdown Induction Period, minutes |
|---|---|
| Unblended gasoline | 495 |
| Gasoline+aldehyde of reaction product of p-cresol and isobutene | 730 |

This invention is not to be considered as limited by any of the examples mentioned or described herein, which are given for illustrative purposes only, but are to be limited solely by the terms of the appended claims.

We claim:

1. A composition consisting essentially of a hydrocarbon material subject to deterioration by atmospheric oxygen, having incorporated therein a small amount, sufficient to substantially inhibit such deterioration, of a product having an aldehyde group, formed by first reacting p-cresol with isobutene in the presence of a catalytic amount of sulfuric acid of about 96% concentration at a temperature of about 70° C., the quantities of p-cresol and isobutene being such and the reaction being carried to such point that a product having a molecular weight of about 220 and an approximate empirical formula of $C_{15}H_{24}O$ results, then submitting the product thus formed to an aldehydic oxidation reaction by contacting the same with an alkali dichromate solution in the presence of sulfuric acid and at a temperature of about 70° to 80° C.

2. A composition according to claim 1 in which the hydrocarbon material subject to deterioration is a mineral lubricating oil.

3. A composition according to claim 1 in which the hydrocarbon material subject to deterioration is a gasoline.

4. A mineral lubricating oil containing a small amount, sufficient to substantially stabilize said oil against oxidation by atmospheric oxygen, of a product having an aldehyde group, formed by first reacting p-cresol with isobutene in the presence of about 5% by weight of commercial concentrated sulfuric acid of about 96% concentration at a temperature of about 70° C., the quantities of p-cresol and isobutene being such and the reaction being carried to such point that a product having a molecular weight of about 220 and an approximate empirical formula of $C_{15}H_{24}O$ results, then submitting the product thus formed to an aldehydic oxidation reaction by contacting the same with a solution consisting essentially of about 2 parts by weight of potassium dichromate, about 6 parts by weight of water, and about 3 parts by weight of 96% sulfuric acid, at a temperature of about 70° to 80° C.

WARREN M. SMITH.
CARROLL J. WILSON.